United States Patent [19]

Vardi et al.

[11] Patent Number: 4,504,396
[45] Date of Patent: Mar. 12, 1985

[54] PURIFICATION SYSTEM

[76] Inventors: Isaih Vardi, 20 Hess St., Rehovot; Yigal Kimchi, 7 Zvi St., Ramat Gan; Jonathan Ben-Dror, Hadar Am, all of Israel

[21] Appl. No.: 358,283

[22] Filed: Mar. 15, 1982

Related U.S. Application Data

[63] Continuation-in-part of Ser. No. 150,046, May 15, 1980, abandoned.

[51] Int. Cl.³ .................. B01D 17/02; B01D 19/00
[52] U.S. Cl. .................................. 210/800; 55/52; 62/101
[58] Field of Search .............. 55/52, 55, 190, 201, 55/124; 210/521, 539, 800; 62/101

[56] References Cited

U.S. PATENT DOCUMENTS

| | | | |
|---|---|---|---|
| 3,184,065 | 5/1965 | Bradford | 210/521 X |
| 3,239,066 | 3/1966 | Schick | 210/521 X |
| 3,276,217 | 10/1966 | Bourne et al. | 62/101 |
| 3,289,427 | 12/1966 | Bourne | 62/101 |
| 3,509,932 | 5/1970 | Chambers | 55/55 X |
| 3,914,175 | 10/1975 | Kunz et al. | 210/521 X |
| 4,276,059 | 6/1981 | Macierewicz | 55/52 |

Primary Examiner—Thomas Wyse
Attorney, Agent, or Firm—Fleit, Jacobson, Cohn & Price

[57] ABSTRACT

The present invention relates to a separator for the separation of non-condensables and of additives from aqueous lithium bromide used in chillers of the type using water as refrigerant and lithium bromide as absorbent, comprising a vessel of adequate size, provided with inlet means for the liquid containing the non-condensables and/or additive, outlet means for the non-condensables and for the solution enriched with additive, and outlet means for the main quantity of the solution depleted of said non-condensables and/or additive, the configuration of the vessel being such that the liquid flows therethrough in a substantially laminar stream, the time of retention in the vessel being adequate to attain the desired degree of separation. A preferred embodiment comprises a separator of horizontal configuration, comprising a conical or polyhedric shell having an opening angle of about 6° to 10°, closed at its diversing end by a wall, inlet means being provided at the narrow end, outlet means for the non-condensables and/or the additive being provided at its upper end and for the main stream of the aqueous lithium bromide at the lower end, at the wider end of the conus or polyhedron.

5 Claims, 6 Drawing Figures

PURIFICATION SYSTEM

RELATION TO OTHER APPLICATIONS

This is a continuation-in-part application of U.S. patent application Ser. No. 150,046 filed May 15, 1980, now abandoned.

FIELD OF THE INVENTION

The present invention relates to improved separation means for separating a predetermined part of 2-ethyl n-hexanol or the like used as additive to aqueous lithium bromide, used in chillers of the type using water as refrigerant, lithium bromide as absorbent for water vapor and 2-ethyl n-hexanol or the like as additive for improving heat exchange in the absorber of the said chiller.

It has been suggested to use separation means in various parts of the refrigeration cycle. The use of such separator means is important as the said additive exerts a beneficial effect in the absorber, but it has a pronounced deleterious effect in the generator of the chiller.

BACKGROUND OF THE INVENTION

The use of 2-ethyl n-hexanol as additive to aqueous lithium bromide has been practiced for many years. It has a very pronounced beneficial effect on heat exchange in the absorber (up to about 20 percent improved performance of the absorber), but a very pronounced deleterious effect in the generator.

This additive is practically immiscible with aqueous lithium bromide, and it has a specific gravity smaller than that of the lithium bromide solution.

The use of separator means in such chillers has been suggested amongst others in U.S. Pat. Nos. 3,289,427 and 3,276,217.

SUMMARY OF THE INVENTION

According to the present invention there are provided novel separator means for separating a predetermined part of the content of 2-ethyl n-hexanol or the like from aqueous solutions of lithium bromide and/or similar compounds and for the separation of non-condensables from such solutions. Non-condensables are gases such as air, hydrogen and other non-condensable gases.

The separator according to the present invention is based on gravity separation. 2-ethyl n-hexanol has a specific gravity smaller than that of aqueous lithium bromide. It is clear that gases not dissolved in such solution will be amenable to gravity separation.

The separators according to the present invention can be constructed in two versions, namely a vertical one, and a horizontal one. The basic features of these are the same. The invention is illustrated with reference to lithium bromide and 2-ethyl n-hexanol but it is not restricted thereto.

The separator according to the present invention comprises a vessel into which there is introduced a stream of aqueous lithium bromide containing non-condensables and/or octyl alcohol (2-ethyl n-hexanol), in such manner that there is established a substantially laminar flow, resulting in the separation of said non condensables and/or alcohol, means being provided for separating the said non-condensables and/or alcohol from the bulk of the solution. According to a preferred embodiment a conduit is provided for part of the solution, substantially enriched with said non-condensables and/or alcohol, while another conduit serves for conveying the bulk of the solution to the heat exchanger and to the generator.

The vertical separator comprises a large vessel provided with funnel-shaped inlet means, a double walled shell provided with outlet means at its upper part, wherein the bulk of the solution moving upward from the funnel-shaped inlet at the lower part of the vessel reverses its direction of flow at the upper part of the vessel, non-condensables flowing upwards both from the main stream and between the inner and outer shells, towards the exit at the top of the vessel. The upper part is connected with a collection vessel for the separated constituents.

A preferred embodiment of the invention relates to a horizontal separator. This comprises a vessel of desired cross-section, with a predetermined angle of opening from its inlet towards its other end, the angle being chosen to result in a laminar flow of the solution (between about 6° and 10°), outlet means for the non-condensables being provided at the upper part of the end remote from the inlet, and at the lower part, below the said outlet, for the bulk of the solution depleted of non-condensables and/or octyl alcohol.

The cross-section of the horizontal separator is a matter of choice. It can be round, oval, rectangular, triangular, polygonal or the like. If rectangular, a preferred embodiment is a square cross-section with gradually increasing area. The preferred position of such separator is such that a corner points upwards. This applies also to a triangular cross section. In all of these there is provided an inlet at the side with the smallest cross-section, and this cross-section increases gradually towards the other end. The opening angle is about 6° to 10°, and the length is chosen in such manner that when a laminar flow is established, the velocity and retention time in the separator are adequate for the desired separation. Generally a length of the separator of from about 50 cm to about 120 cm is adequate. A duration of retention in the separator of from about 30 to 50 seconds is generally adequate for the separation of gaseous non-condensables, such as air and hydrogen. For the separation of octyl alcohol longer retention times, of the order of about 50 to 100 seconds are required.

DESCRIPTION OF THE PREFERRED EMBODIMENT

The invention is described in the following with reference to the enclosed schematical drawings, which are not according to scale, and in which.

Figures 1, 2:
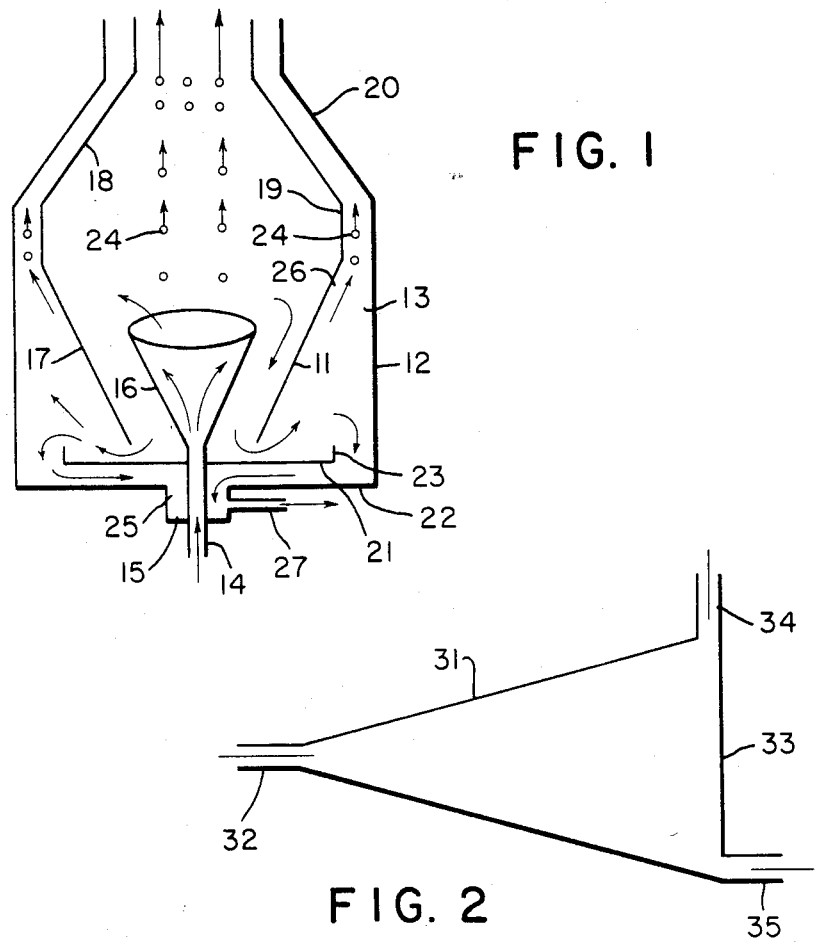
FIG. 1 is an elevational cross-sectional view of a vertical separator.
FIG. 2 is a cross-sectional side view through a horizontal separator.

The vertical separator according to FIG. 1 comprises in combination an inner shell 11 and an outer shell 12, defining a space 13 between same. An inlet 14 passes through the bottom 15 of the outer shell 12 and opens up in the form of a funnel-shaped member 16, open at its upper end. The inner shell 11 comprises two conical sections 17 and 18 and a cylindrical section 19, said conical sections being open at the lower end at the upper ends. The outer shell 12 has a converging upper part 20, open at its upper end and connected with a vessel for the separated constituents. A horizontal plate 21 is provided above the bottom 22 of the outer shell 12, provided with upturned edges 23 at its circumference. The solution enters through inlet 14 and through funnel shaped member 16 and flows upwards. Non-condensable gases tend to separate and move upwards, as indicated by bubbles 24. The gases are collected in a vessel at the top, not shown in the Figure. The direction of flow of the liquid is reversed as it approaches the upper end of the separator and it flows downwards along the inner walls of the inner shell 11, and towards the exit 25. Non-condensables move upward in the space between the two shells as indicated by arrow 26 while the main part of the depleted solution leaves via exit port 25 and conduit 27. The dimensions of the vessel are chosen so as to obtain a substantially laminar flow therein and a retention time adequate for the separation. If 2-ethyl n-hexanol is to be separated, this moves upwards due to its lower specific gravity and is collected in a vessel at the top of the separator. If non-condensable gases are separated, these move upwards and leave through a suitable opening in the upper part of the separator or they are collected in a vessel at the top of the separator.

Figure 3:
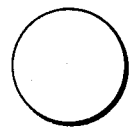
FIGS. 3 to 6 are cross-sectional views at a—a of FIG. 2 illustrating a number of possibilities.
Figure 4:
Figure 5:
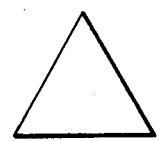
Figure 6:
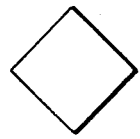

A horizontal type of separator is illustrated with reference to FIGS. 2 to 6. As shown in FIG. 2, the separator comprises a conical or polyhedric shell 31, the axis of which is substantially horizontal. This is provided at its left-hand side with entrance means 32 for the stream of solution containing the non-condensibles which are to be separated. The opening angle of this shell is about 6° to 10°, resulting in a laminar flow of the liquid towards the right hand side. The shell is closed at its right hand side by wall 33, an outlet 34 for the non-condensables being provided at the upper part and an outlet 35 for the main stream of liquid at the lower end. When the cross section is a circular one, as shown in FIG. 3, the shell is a conical one. If the cross-section is a triangular as shown in FIG. 5, the shell is a pyramidal one and in this case best results are obtained when the apex of the shell is as shown in FIG. 5, pointing upwards. A square cross-section, as illustrated in FIGS. 4 and 6 can be used, and in this case the position with the apex pointing upwards, as shown in FIG. 6 gives better results. Any other polygonal or curved cross-section can be used. The length of the shell is chosen in such manner that there is obtained an adequate retention time of the liquid in the separator for the desired degree of separation. With gaseous non-condensables a retention time of about 30 to 40 seconds from entry to exit is usually adequate. With additives such as 2-ethyl n-hexanol a retention time of about 50 to 100 seconds is required. The length of the vessel is generally from 50 to about 120 cm. The separator is quite efficient: a larger part of the non-condensable gases such as air and hydrogen is removed while passing through the separator. When a mixture of aqueous lithium bromide and 2-ethyl n-hexanol is introduced, a separation of about 20 to 80 percent of the additive is attained per pass through the separator.

It is clear that various changes and modifications in the construction and arrangement of parts may be resorted to without departing from the spirit and scope of the present invention.

We claim:

1. A method for separating at least one of non-condensable gases and immiscible liquids from an aqueous refrigerant in a horizontal vessel comprising the steps of:
   (a) feeding a stream of aqueous refrigerant containing at least one of non-condensable gases and an immiscible liquid to an inlet of a vessel, the specific gravity of the aqueous refrigerant being greater than the specific gravity of the at least one non-condensable gases and immiscible liquid, said vessel comprising a shell of increasing cross-sectional area along a horizontal axis, said shell is one of a conical and a polyhedral shape, the walls of said shell along said axis being outwardly divergent at an angle of between about 6° to 10°, defining a small convergent inlet end and a large divergent closed outlet end, an inlet means at the small convergent end, an upper outlet means at the upper portion of the divergent end, and a lower outlet means at a lower portion of the divergent end;
   (b) flowing the aqueous refrigerant through the vessel in substantially unobstructed laminar flow;
   (c) separating the aqueous refrigerant from at least one of the condensable gases and immiscible liquid by gravity-type separation;
   (d) removing at least one of the non-condensable gases and immiscible liquid from the vessel through the upper outlet means; and
   (e) removing the aqueous refrigerant through the lower outlet means.

2. The method of claim 1, wherein the cross-sectional area of the vessel is circular, square, triangular or polygonal.

3. The method of claim 2, wherein the cross-sectional area is triangular or square, and the vessel is positioned with a corner forming the apex of the structure.

4. The method of claim 1, wherein the liquid is retained in the vessel for between 30 to 40 seconds.

5. The method of claim 1, wherein the immiscible liquid is 2-ethyl n-hexanol and the aqueous refrigerant is aqueous lithium bromide, and the liquid is retained in the vessel for about 50 to 100 seconds.

* * * * *